(12) United States Patent
Halterbeck

(10) Patent No.: US 7,028,833 B2
(45) Date of Patent: Apr. 18, 2006

(54) METHOD FOR CONNECTING THE BELT ENDS OF TRANSPORT BELTS, AS WELL AS TRANSPORT BELT AND CLOSURE AID FOR CARRYING OUT SAID METHOD

(75) Inventor: Walter Halterbeck, Duren (DE)

(73) Assignee: Heimbach GmbH & Co., Duren (DE)

( * ) Notice: Subject to any disclaimer, the term of this patent is extended or adjusted under 35 U.S.C. 154(b) by 0 days.

(21) Appl. No.: 10/821,183

(22) Filed: Apr. 9, 2004

(65) Prior Publication Data

US 2005/0224319 A1 Oct. 13, 2005

(51) Int. Cl.
*B65G 17/00* (2006.01)
(52) U.S. Cl. .................................. 198/844.2
(58) Field of Classification Search ............. 198/844.2; 254/199, 237, 246, 247; 294/132, 135, 136
See application file for complete search history.

(56) References Cited

U.S. PATENT DOCUMENTS

| 960,201 | A | * | 5/1910 | Rudy, Jr. ..................... 254/233 |
| 3,972,105 | A | | 8/1976 | Miller et al. |
| 4,035,872 | A | | 7/1977 | MacBean |
| 4,340,206 | A | * | 7/1982 | McJunkin, Jr. ............. 254/199 |
| 5,431,371 | A | * | 7/1995 | Daniels et al. .............. 294/132 |
| 5,725,269 | A | * | 3/1998 | Daniels et al. .............. 294/132 |

FOREIGN PATENT DOCUMENTS

| DE | 2703147 C2 | 8/1977 |
| DE | 3147115 A1 | 6/1983 |
| DE | G8812667.6 | 1/1989 |
| EP | 0018200 | 10/1980 |
| EP | 0118406 | 9/1984 |
| EP | 0182597 | 5/1986 |
| EP | 0211471 | 2/1987 |
| EP | 0041232 | 10/1987 |
| EP | 0311828 | 4/1989 |
| EP | 0332146 | 9/1989 |
| EP | 0564436 B1 | 10/1993 |
| EP | 0848188 | 6/1998 |
| FR | 2263425 | 10/1975 |
| GB | 1016649 | 1/1966 |

* cited by examiner

*Primary Examiner*—Douglas Hess
(74) *Attorney, Agent, or Firm*—Berenato, White & Stavish, LLC

(57) ABSTRACT

The invention concerns a method for connecting the belt ends (9, 10) of transport belts (1) using a closure aid (13) that comprises a plurality of closure aid elements (14, 15) that are fastened at a distance from one another in the region of the two belt ends (9, 10) in such a way that they link the belt ends (9, 10), the closure aid elements (14, 15) having tensioning elements (23) that pull the belt ends (9, 10) toward one another, and the belt ends (9, 10) then being connected to one another by means of coupling elements (11, 12) and the closure aid (13) then being removed from the transport belt (1). Lashing straps (14, 15) having a lashing mechanism (23) are used as closure aid elements, actuation thereof reducing the distance between the belt ends (9, 10).

The invention further concerns a transport belt (1) having coupling elements (11, 12) mounted on its front belt ends (9, 10), and a closure aid (13) for temporary connection of the front belt ends (9, 10) of the transport belt (1).

16 Claims, 3 Drawing Sheets

METHOD FOR CONNECTING THE BELT ENDS OF TRANSPORT BELTS, AS WELL AS TRANSPORT BELT AND CLOSURE AID FOR CARRYING OUT SAID METHOD

The invention concerns a method for connecting the front belt ends of transport belts using a closure aid that comprises a plurality of closure aid elements that are fastened at a distance from one another in the region of each of the two belt ends, by way of attachment members, in such a way that they each link the belt ends, the closure aid elements having tensioning elements that pull the belt ends toward one another, and the belt ends then being connected to one another by means of coupling elements, and the closure aid then being removed from the transport belt. The invention furthermore refers to a transport belt having coupling elements mounted on its front belt ends, and having a closure aid that comprises a plurality of closure aid elements that have attachment members and, between the latter, tensioning elements, the attachment members being attached or attachable in the region of the belt ends in such a way that the closure aid elements link the belt ends, the closure aid being removable from the transport belt after the coupling has been made. Lastly, the invention concerns a closure aid for temporary connection of the front belt ends of a transport belt, comprising a plurality of closure aid elements that have attachment members for attachment to the transport belt, as well as tensioning elements.

Transport belts are known in a wide variety of embodiments. They serve to transport objects or bulk materials, here performing purely transportation-related tasks. Transport belts are also, however, used in machines in order, for example, to dry bulk materials or webs. In this case the transport belts are embodied in sieve-like fashion and consequently are permeable. These also include so-called paper machine clothings; these are very wide and long screens or felts that serve to shape and transport the paper web through the paper machine and to support the paper web.

Such transport belts are often endless, so they can more easily be pulled into the associated machine. The front belt ends must then be connected to one another by way of a seam; the term "seam" is to be understood here very broadly, and also encompasses connections that have not been created by sewing.

The pintle wire seam has proven particularly suitable for connecting the belt ends of such transport belts. With this type of seam, a plurality of eyelets are configured at both belt ends, and for purposes of connecting the belt ends are made to overlap one another in comb fashion so that a pintle wire conduit is created parallel to the belt ends and transversely to the running direction of the transport belt. A pintle wire made of metal or plastic is slid through this conduit, thereby coupling the belt ends to one another.

If the transport belt is made of a textile or has a textile as support, it is known to configure the eyelets using looped-back longitudinal yarns (cf. EP 0 182 597 B1; DE-A-2 338 263). Instead of this, however, special eyelet bands connected to the belt ends can also be provided (cf. GB-A-1 016 649). The eyelets can also be constituted by coils (cf. EP 0 564 436 B1).

The idea of causing coils extending transversely to the transport direction to overlap and then coupling them to one another by means of a pintle wire has led to a new species of transport belt, namely the so-called wire element belts. These belts comprise a plurality of wire coils extending transversely to the transport direction, each two adjacent wire coils overlapping in comb fashion and being coupled by means of a pintle wire (cf. EP 0 018 200 B2; DE 31 47 115 A1, EP 0 211 471 B1). These wire element belts can be used in a great many ways, including for example as dryer fabrics in paper machines.

Since such transport belts are often very long and wide (e.g. more than 50 m long and up to 11.5 m wide), and can moreover have a weight per unit area of 1000 g/m$^2$ and more, pulling such transport belts into the associated machine presents considerable handling difficulties. It is particularly difficult in this context to bring the two belt ends close to one another and into a position such that, e.g. in the case of a pintle wire seam, the eyelets overlap in comb fashion and a pintle wire can be inserted in order to couple the belt ends to one another and make the transport belt endless. To simplify this operation, closure aids have been developed that are temporarily mounted in the region of the two belt ends and link them. With the closure aids, the belt ends can be brought into a position which allows the belt ends to be coupled, and in which the belt ends are not under tensile stress. After coupling of the belt ends, the closure aid in question is then removed. It is thus only temporarily connected to the belt ends.

Various embodiments of closure aids are known. In the closure aids defined in DE 27 03 147 C2 and U.S. Pat No. 4,035,872, a zip fastener is used whose two halves are detachably attached to the belt ends, after which the zip fastener is then closed. In the closure aid according to EP 0 041 232 B2, strips connected to one another by clamps are sewed onto the belt ends. Pairs of complementary profiles that are brought into engagement with one another are also used as closure aids (cf. EP 0 118 406 A1; DE Utility Model 88 12 667.6). A hybrid between the zip fastener and clamp profiles is described in FR-A-2 263 425.

As a rule, the aforementioned closure aids require a very precise positional attachment of the closure aid to the two belt ends, since otherwise the belt ends will not be in the position necessary for coupling after closure of the closure aid. With the zip fastener solutions, the belt ends must moreover be manually brought very close to one another or in fact made to overlap. Considerable strength is needed for this, so that such closure aids are almost impossible to use for large belts.

With the transport belt according to U.S. Pat. No. 3,972,105, a closure aid comprising a plurality of closure aid elements, distributed over the width of the transport belt, is used. Each individual closure aid element comprises end-mounted attachment members having mandrels, protruding in the direction toward the transport belt, that dig into the transport belt when placed onto it. Each two oppositely located attachment members of a closure aid element are connected to one another by a helical spring stressed in tension and constituting a tension element. The helical springs of the closure aid elements are intended to pull the belt ends together in such a way that the loops provided at the belt ends are made to overlap in comb fashion, and a pintle wire can be slid through the conduit thus formed. The closure aid elements are then removed again.

A disadvantage of this closure aid is that the closure aid elements must be tensioned, by pulling the helical springs apart, before the attachment members are secured to the transport belt. Only in this way can a tensile force be exerted on the belt ends to cause the eyelets to overlap. A closure aid of this kind is not usable with heavy transport belts, since very stiff springs, which could not be sufficiently pulled apart by hand, would then need to be used.

It is the object of the invention to make available a method for connecting the belt ends of transport belts with which the belt ends of even heavy transport belts can be brought into the coupling position quickly and precisely and without exertion of great force, even if the belt ends are initially far apart from one another. A further object is that of conceiving a transport belt suitable for carrying out the method, and a closure aid therefor.

As regards the method, this object is achieved according to the present invention in that lashing straps, each having a lashing mechanism, are used as closure aid elements, actuation thereof causing the distance between the belt ends to be reduced to a coupling position that allows them to be coupled.

As regards the transport belt itself and the closure aid, the object is achieved in that the closure aid elements are embodied as lashing straps that, as tensioning elements, each comprise a lashing mechanism.

The basic idea of the invention is thus to use so-called lashing straps as closure aid elements. Lashing straps of this kind are essentially known. They are used in particular to secure objects on commercial vehicles. Examples thereof may be inferred from EP 0 311 828 A2 and EP 0 848 188 A2. They comprise a lashing mechanism with which large forces can be applied manually onto the belt or belts of the lashing strap. With the use of a plurality of such lashing straps, distributed over the width of the transport belt and each linking the belt ends, those belt ends can be brought into a coupling position even when the belt ends are located very far away from one another (e.g. three or four meters), and/or when the transport belt is very heavy because of its length and width and it would thus be impossible, or possible only with great difficulty and a corresponding expenditure of time, to bring the belt ends together by hand. It is also immaterial whether the coupling position in the machine is located in a horizontal, vertical, or diagonal stretch, even if the transport belt is hanging loosely.

With the use of the closure aid according to the present invention, the coupling of even heavy transport belts proceeds quickly. The lashing straps can be tensioned to an accuracy of millimeters even under large tensile forces, so that the belt ends can be brought precisely into the intended position. The locations at which the attachment elements are connected to the transport belt are unimportant in this context, i.e. a specific distance to the belt end need not be maintained. This facilitates installation of the closure aid. The closure aids can also be used repeatedly, and moreover can be mounted on both sides.

In an embodiment of the invention, provision is made for the lashing straps to be arranged at a spacing of 30 to 50 cm, the spacing being smaller, the greater the weight of the transport belt and the greater the tension exerted by the force of gravity on the belt ends. The attachment members can each be attached at a distance of 20 to 80 cm from the belt end.

Both two-piece and one-piece lashing straps are known in the existing art. A two-piece lashing strap has a first strap on which the lashing mechanism is attached, and a second strap that can be connected to the lashing mechanism. When lashing straps of this kind are used as closure aid elements, the first strap respectively is attached on the transport belt in the region of the one belt end, and the second strap in the region of the other belt end, by way of the attachment members. This can be done, for example, by stitching.

As an alternative to this, however, the possibility also exists of using one-piece lashing straps having only a single strap. In this case, for each lashing strap an eyelet is mounted in opposite fashion in the region of the respective belt ends as the attachment member. The strap is then guided through the two opposite eyelets, and its free end is coupled to the lashing mechanism. The eyelets can be formed, for example, from a textile strap loop. Textile fabrics made e.g. from polyester, or glass fiber-reinforced plastic belts, are suitable for this. These materials are also suitable for the straps.

If the transport belt is embodied as a wire element belt, the attachment members can be connected to the transport belt by having coils mounted on them or by being made therefrom, and by then being pushed into the transport belt transversely to the surface and coupled to it by insertion of a pintle wire into the transport belt. If the attachment members are secured by stitching, an auxiliary belt should be sewn between the attachment members and the transport belt in order to relieve stress on the surface of the transport belt.

The lashing mechanism comprises, in a manner known per se, a winding shaft that is rotatable in the winding-on direction with the aid of a lashing lever. This is advantageously done in such a way that the winding shaft is in engagement with a first ratchet which prevents rotation of the winding shaft in the unwinding direction, and so that the winding shaft is in engagement via a second ratchet with the lashing lever, with which the winding shaft can be driven only in the winding-on direction. Lashing mechanisms of this kind have proven successful in lashing straps used for other purposes. Large forces and accurate positioning can be attained with them. Disengagement of the first ratchet allows the lashing straps to be loosened and then removed from the transport belt.

It is additionally possible to use lashing straps in which the lashing mechanism is equipped with a ratchet that provides a locking capability for the tensioned strap. In this fashion, once the strap has been wound on, it can be pulled further under tension in order to obtain additional tensioning travel.

The invention is illustrated in more detail in the drawings, with reference to an exemplary embodiment. In the drawings.

Figure 1:
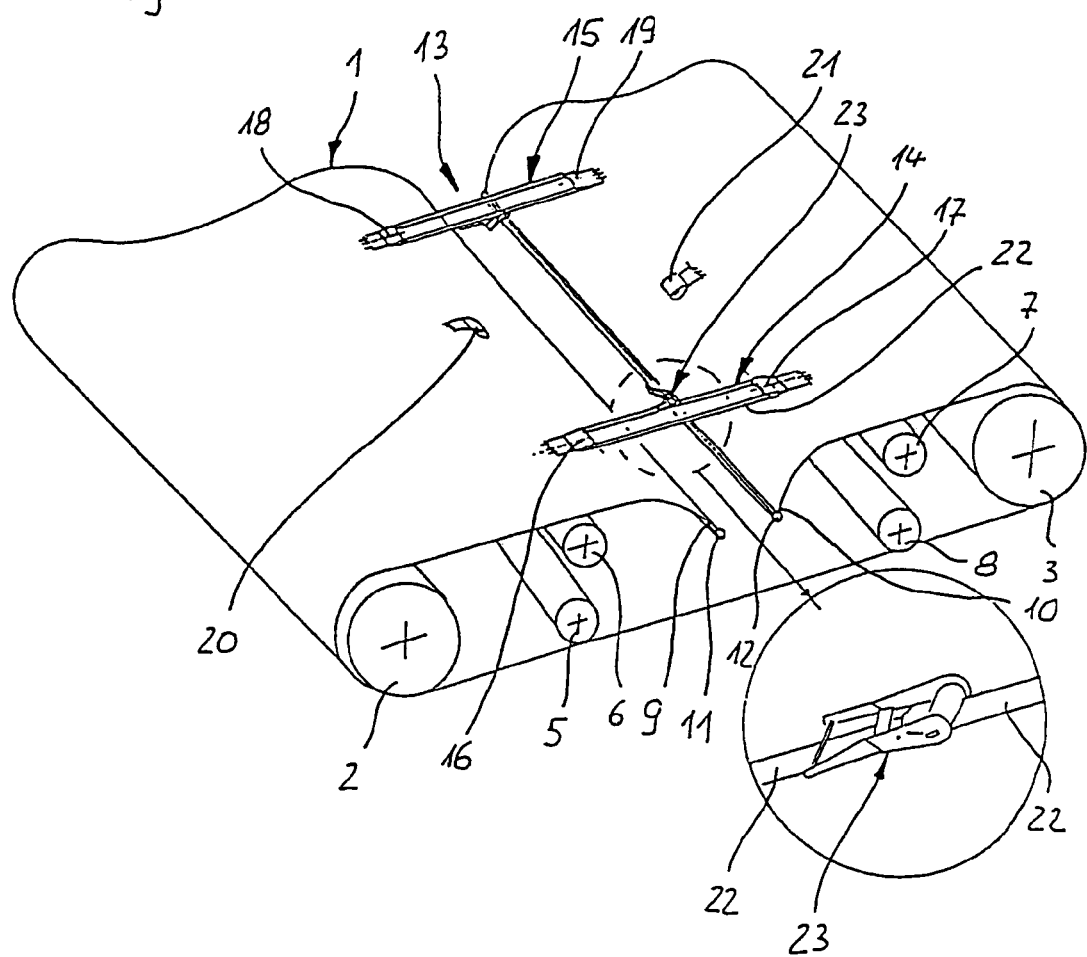
FIG. 1 is a perspective view of a transport belt with closure aid in the uncoupled state.

Transport belt 1 depicted in FIG. 1 is placed around two end-mounted reversing rollers 2, 3 and is additionally supported by a total of four support rollers 5, 6, 7, 8. It is endless in configuration, i.e. it has front belt ends 9, 10 that are equipped with coupling coils 11, 12 extending over the entire width of belt ends 9, 10 transversely to the running direction of transport belt 1. Coupling loops 11, 12 are suspended from longitudinal yarns of the textile that are laid in looped fashion around the limbs of coupling coils 11, 12 close to belt ends 9, 10, and have been woven back into the textile of transport belt 1.

Transport belt 1 is made of a textile comprising plastic yarns, for example made of polyester or polyphenylene sulfide. Its longitudinal yarns extend in the running direction of transport belt 1.

Belt ends 9, 10 are linked by a closure aid 13 that comprises three lashing straps arranged at equal distances from one another, of which only the outer two lashing straps 14, 15 are depicted. Lashing straps 14, 15 are secured respectively between two belt loops 16, 17 and 18, 19, one belt loop 16 or 18 being respectively arranged in the region of the left belt end 9 and the other belt loops 17, 19 in the region of the right belt end 10, and are located opposite one another. Another two mutually opposite belt loops 20, 21 are arranged between the two lashing straps 14, 15 so that a further lashing strap can be accommodated. Belt loops 16 through 21 are sewn together at the ends and temporarily sewn there onto transport belt 1 by means of seams (not depicted here in more detail), with interposition of an auxiliary belt to relieve stress on the belt's surface.

Figure 3:
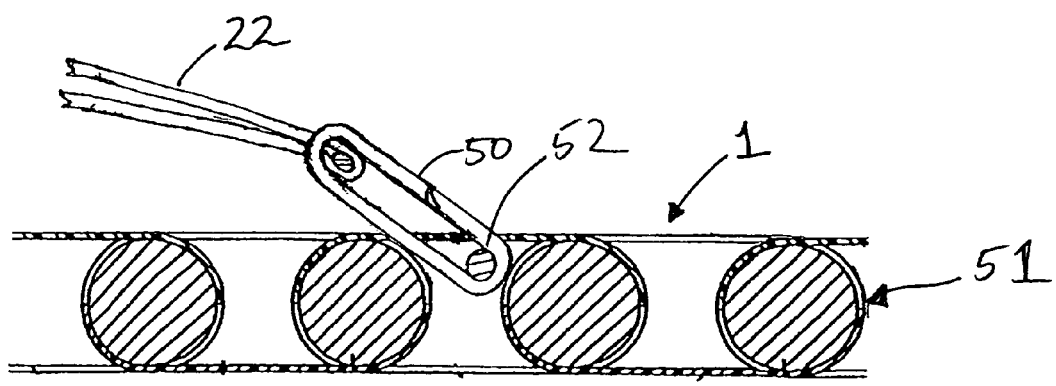
FIG. 3 is a side view of the lashing strap attached to the transport belt.

Alternatively, the lashing straps may be connected to the transport belt by way of coils. With reference to FIG. 3, coils 50 are inserted into the transport belt 1, which is shown as a wire element belt 51. The coils 50 are coupled to the belt by way of a pintle wire 52 inserted into the transport belt 1.

Figure 2:
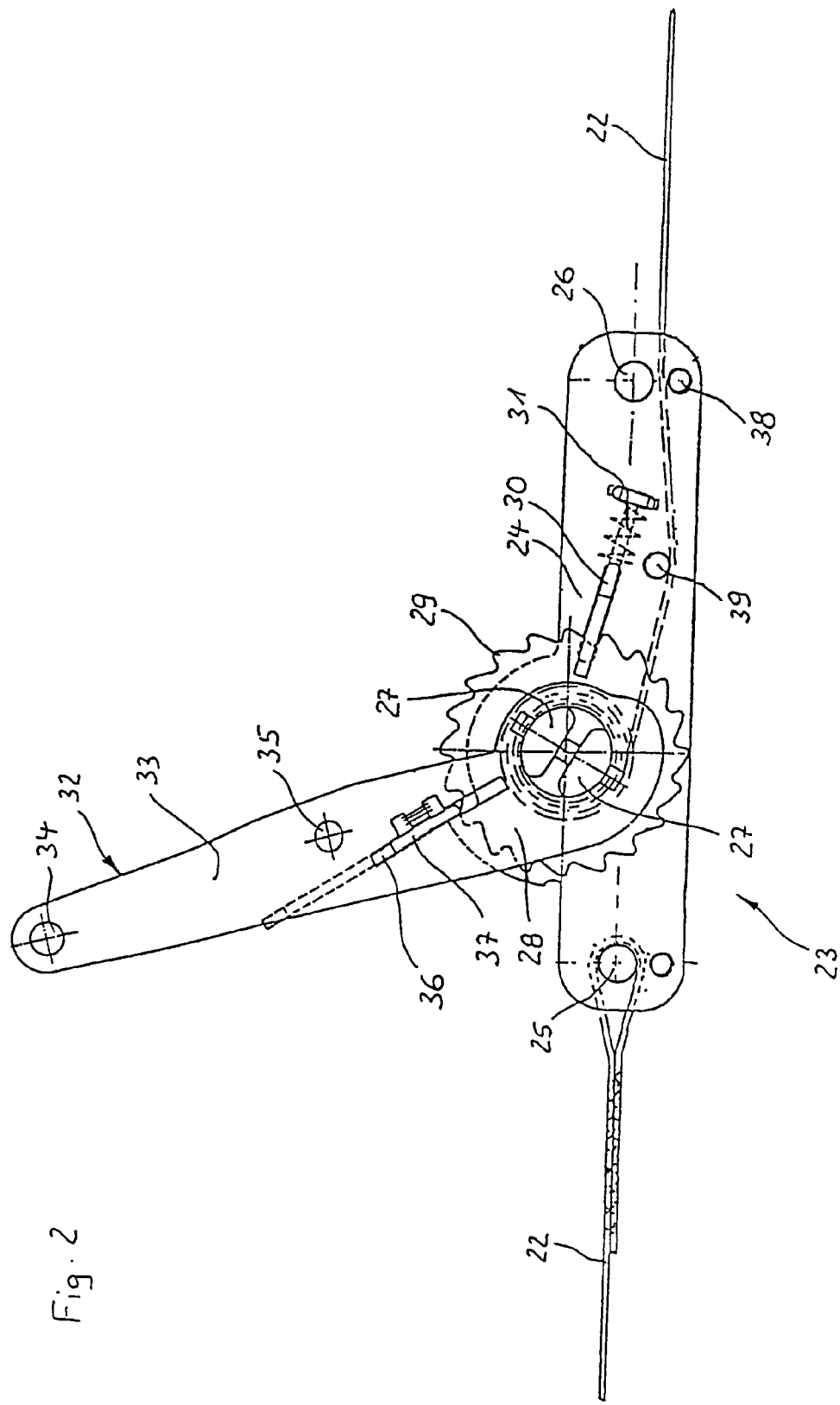
FIG. 2 is a side view of the lashing mechanism of a lashing strap constituting the closure aid for the transport belt as shown in FIG. 1.

Lashing strap 14 is embodied in one piece and has a strap 22 at one of whose ends is attached a lashing mechanism 23 that is depicted somewhat larger in the circular detail but is evident concretely only from FIG. 2. Strap 22 firstly extends from lashing mechanism 23 toward belt loop 16, passes through belt loop 16, and then extends toward belt loop 17. Strap 22 is likewise inserted through this belt loop 17. It then extends in the opposite direction, i.e. toward lashing mechanism 23. There, as is evident in more detail from FIG. 2, the end of strap 22 is wound onto a winding shaft of lashing mechanism 23. Second lashing strap 15 is guided in the same way through belt loops 18, 19.

Lashing mechanism 2 depicted in FIG. 23 comprises two lateral cheekpieces 24, lying behind one another when looking down at the drawing, that are connected to one another and held apart by end studs 25, 26.

Mounted in lateral cheekpieces 24 is a winding shaft 27. It projects outward beyond lateral cheekpieces 24 and has there in each case a ratchet wheel 28 having a ratchet tooth set 29. Ratchet tooth set 29 is in engagement with a first ratchet blade 30 that is mounted displaceably in slots in lateral cheekpieces 24 and is pushed by a compression spring 31 toward ratchet tooth set 29. Ratchet blade 30 permits a rotation of winding shaft 27 clockwise, but not in the opposite direction.

A lashing lever 32 is mounted on winding shaft 27 so as to rotate freely, i.e. relative to winding shaft 27. Lashing lever 32 comprises two lever arms 33, arranged at a distance from one another, that are kept apart by spacing studs 34, 35. Upper spacing stud 34 serves as a handle.

Lever arms 33 comprise parallel and oppositely located guide slots 36 in which a second ratchet blade 37 is mounted, displaceably substantially radially with respect to winding shaft 27. It is in engagement with ratchet tooth sets 29 of ratchet wheels 28. A clockwise motion of lashing lever 32 causes winding shaft 27 to be entrained by means of second ratchet blade 37.

At the left end of lashing mechanism 23, strap 22 is attached by the fact that it is placed around end stud 25 and the free end has been stitched to strap 22. After passing through belt loops 16, 17 (FIG. 1), strap 22 comes back to lashing mechanism 23 and there, guided by the two end studs 26 and two guide rollers 38, 39, extends to winding shaft 27. A portion of strap 22 is already wound on there.

For further tensioning of strap 22, lashing lever 32 is moved back and forth an appropriate number of times. Winding shaft 27 is entrained during the clockwise motion, with the result that strap 22 is wound further onto winding shaft 27. As lashing lever 32 is moved backward, second ratchet blade 37 ratchets over ratchet tooth set 29 while winding shaft 27 is retained by first ratchet blade 30, i.e. winding shaft 27 cannot move counterclockwise.

Using lashing mechanism 23, it is thus possible to bring belt ends 9, 10 sufficiently close to one another that coupling coils 11, 12 can be made to overlap, thus forming a conduit through which a pintle wire can be inserted. Once this has happened, lashing strap 14 can be loosened by moving first ratchet blade 30 out of its engaged position against the action of compression spring 31. Winding shaft 27 is then released and can rotate counterclockwise, with the result that strap 22 unwinds from winding shaft 27. The same applies, of course, to lashing strap 15. Lashing straps 14, 15 can then be pulled out of belt loops 16, 17 and 18, 19, and all the belt loops 16 through 21 can be removed.

What is claimed is:

1. A method for connecting the front belt ends (9, 10) of transport belts (1) using a closure aid (13), comprising the steps of:

fastening a plurality of closure aid elements (14, 15) at a distance from one another in the region of each of the two belt ends (9, 10), by way of attachment members (16, through 21), in such a way that they each link the belt ends (9, 10), the closure aid elements (14, 15) having tensioning elements (23) that pull the belt ends (9, 10) toward one another;

connecting the belt ends (9, 10) to one another by means of coupling elements (11, 12); and removing the closure aid (13) from the transport belt (1), wherein lashing straps (14, 15), each having a lashing mechanism (23), are used as closure aid elements, actuation thereof causing the distance between the belt ends (9, 10) to be reduced to a coupling position that allows them to be coupled.

2. The method as defined in claim 1, wherein the lashing straps (14, 15) are arranged at a spacing of 30 to 150 cm.

3. The method as defined in claim 1, wherein the attachment members (16 through 21) are each attached at a distance of 20 to 80 cm from the belt end (9, 10).

4. The method as defined in claim 1, wherein two-piece lashing straps each having a first strap on which the lashing mechanism is attached, and each having a second strap, are used, the first strap respectively being attached on the transport belt in the region of the one belt end, and the second strap in the region of the other belt end, by way of the attachment members.

5. The method as defined in claim 1, wherein one-piece lashing straps (14, 15) having a single strap (22) are used; and an eyelet (16 through 21) is mounted in respectively opposite fashion in the region of the respective belt ends (9, 10) as the attachment member; and a respective strap (22) is then guided through two opposite eyelets (16, 17 and 18, 19 and 20, 21) and its free end is coupled to the lashing mechanism (23).

6. The method as defined in claim 5, wherein the eyelets are formed from strap loops (16 through 21).

7. The method as defined in claim 1, wherein the attachment members comprise or are made from coils that are pushed into a transport belt embodied as a wire element belt and coupled to it by insertion of a pintle wire into the transport belt.

8. The method as defined in claim 1, wherein an auxiliary belt is provided between the attachment members (16 through 21) and the transport belt (1).

9. A transport belt (1) having coupling elements (11, 12) mounted on its front belt ends (9, 10), and having a closure aid (13) that comprises a plurality of closure aid elements (14, 15) that have attachment members (16, through 21) and, between the latter, tensioning elements (23), the attachment members (16 through 21) being attached or attachable in the region of the belt ends (9, 10) in such a way that the closure aid elements (14, 15) link the belt ends (9, 10), the closure aid (13) being removable from the transport belt (1) after the coupling of the belt ends (9, 10) has been made, wherein the closure aid elements are embodied as lashing straps (14, 15) that, as tensioning elements, each comprise a lashing mechanism (23).

10. The transport belt as defined in claim 9, wherein the lashing straps (14, 15) are arranged at a spacing of 30 to 150 cm transversely to the running direction of the transport belt (1).

11. The transport belt as defined in claim 9, wherein the attachment members (16 through 21) are each attached at a distance of 20 to 80 cm from the belt end (9, 10) in the running direction of the transport belt (1).

12. The transport belt as defined in claim 9, wherein the lashing straps are embodied in two pieces, having respectively a first strap on which the lashing mechanism is attached, and having a second strap, the first strap respectively being secured on the transport belt in the region of the one belt end, and the second strap in the region of the other belt end, by way of the attachment members.

13. The transport belt as defined in claim 9, wherein the lashing straps (14, 15) are embodied in one piece, having respectively a single strap (22); and an eyelet (16 through 21) is mounted in respectively opposite fashion in the region of the respective belt ends (9, 10) as the attachment member; and a respective strap (22) is then guided through both opposite eyelets (16, 17 and 18, 19 and 20, 21) and its free end is coupled to the associated lashing mechanism (23).

14. The transport belt as defined in claim 9, wherein the attachment members comprise or are made from coils that are inserted into a transport belt embodied as a wire element belt and coupled to it by way of a pintle wire inserted into the transport belt (1).

15. The transport belt as defined in claim 9, wherein each lashing mechanism (23) comprises a winding shaft (27) that is rotatable in the winding-on direction with the aid of a lashing lever (32).

16. The transport belt as defined in claim 15, wherein the winding shaft (27) is in engagement with a first ratchet (29, 30) that prevents rotation of the winding shaft (27) in the unwinding direction; and the winding shaft (27) is in engagement via a second ratchet (29, 37) with the lashing lever (32), with which the winding shaft (27) can be driven only in the winding-on direction.

* * * * *